United States Patent [19]
Wittes

[11] Patent Number: 5,665,294
[45] Date of Patent: Sep. 9, 1997

[54] METHOD OF MAKING CLEANING PADS FOR TAPE TRANSPORT CLEANING DEVICES

[75] Inventor: James M. Wittes, Bernardsville, N.J.

[73] Assignee: AccTech, L.L.C., Nanuet, N.Y.

[21] Appl. No.: 519,532

[22] Filed: Aug. 25, 1995

Related U.S. Application Data

[62] Division of Ser. No. 234,438, Apr. 28, 1994, abandoned.

[51] Int. Cl.⁶ .................................................. B29C 59/02
[52] U.S. Cl. ........................ 264/160; 264/293; 264/321
[58] Field of Search .............................. 264/293, 321, 264/146, 160

[56] References Cited

U.S. PATENT DOCUMENTS

| | | | |
|---|---|---|---|
| 2,946,713 | 7/1960 | Dusina et al. | 264/321 |
| 3,197,357 | 7/1965 | Schulpen | 264/321 |
| 3,244,571 | 4/1966 | Weisman | 264/321 |
| 3,506,749 | 4/1970 | Weissman | 264/293 |
| 3,761,994 | 10/1973 | Clausen et al. | 15/210.1 |
| 3,977,406 | 8/1976 | Roth | 264/321 |
| 4,105,738 | 8/1978 | Rohn | 264/321 |
| 4,278,482 | 7/1981 | Poteet et al. | 264/321 |
| 4,360,491 | 11/1982 | Holden, Jr. | 264/321 |
| 4,445,158 | 4/1984 | Clausen et al. | 360/137 |
| 4,454,550 | 6/1984 | Clausen et al. | 360/137 |
| 4,454,551 | 6/1984 | Clausen et al. | 360/137 |
| 4,855,855 | 8/1989 | Stanton | 360/137 |
| 5,211,897 | 5/1993 | Albertelli et al. | 264/321 |
| 5,326,354 | 7/1994 | Kwarteng | 264/293 |

FOREIGN PATENT DOCUMENTS

| | | | |
|---|---|---|---|
| 623920 | 7/1961 | Canada | 264/321 |
| 43-26100 | 11/1968 | Japan | 264/321 |
| 48-28786 | 9/1973 | Japan | 264/321 |
| 49-3834 | 1/1974 | Japan | 264/321 |
| 63-16257 | 4/1988 | Japan | 264/321 |
| 1142494 | 2/1969 | United Kingdom | 264/321 |

*Primary Examiner*—Allan R. Kuhns
*Attorney, Agent, or Firm*—Allen N. Friedman

[57] ABSTRACT

The cleaning elements are used in cleaning cassettes for cleaning the tape-contacting parts of a tape transport device, particularly a data tape transport device. The cleaning elements are high-density springy, absorbent foam pads each having an indented linear fused section or groove transverse to the direction in which wiping forces tend to remove the cleaning element from its holder. Ridges are provided in the holder to engage the grooves so as to securely hold the cleaning elements in place, and make it relatively easy to remove and replace them. The pads are made by partially die-cutting a foam sheet to form individual pads which can be torn free from the sheet along perforation lines, and forming the linear fused section in each of a plurality of pads simultaneously by contacting the sheet with a linear heated die.

11 Claims, 8 Drawing Sheets

METHOD OF MAKING CLEANING PADS FOR TAPE TRANSPORT CLEANING DEVICES

This application is a division of application Ser. No. 08/234,438, filed Apr. 28, 1994, now abandoned.

BACKGROUND OF THE INVENTION

1. Field of the Invention

This invention relates to cleaning magnetic type transport devices.

Cleaning cassettes have been provided for some time for use in cleaning the capstan wheels and record/reproduce heads of tape transport devices.

2. Description of the Prior Art

A problem in cleaning some tape transports, especially data tape transports, is caused by the fact that the capstan wheel is used to drive the mechanism used to clean the record/reproduce head. This makes it difficult to provide a single cassette which will clean both the capstan wheel and the record/reproduce head.

Convertible cleaning cassettes have been provided in order to solve the foregoing problems. A single cassette with two inserts is provided. One insert contains a gear which engages with one or more gears within the cassette and cause the capstan wheel to drive a wiper arm to wipe a cleaning element over the recording/reproducing head and clean it. When it is desired to clean the capstan wheel, the first insert is removed and replaced with the second insert, which has a cleaning element which cleans the capstan wheel.

Thus, a single cassette is provided, but two separate inserts are required. The inserts are relatively difficult and cumbersome to use. Furthermore, the molds and the labor used to make the inserts can be relatively expensive because of the intricacy of the components.

Other problems with prior tape cleaning cassettes lie in the cleaning elements themselves. In kits in which convertible cleaning cassettes are provided, cleaning elements of two different shapes are used; one for cleaning the heads, and the other for cleaning the capstan wheel. This again complicates the use of the cleaning cassette because the operator must know, or figure out, which cleaning element is used in which device. Furthermore, the cleaning elements either tend to pull out of their holders too readily, thus causing malfunction of the cleaning device, or they require special tools, such as a special pair of tweezers, to remove the soiled cleaning elements and replace them with new ones.

OBJECTS OF THE INVENTION

Accordingly, it is an object of the present invention to provide a tape transport cleaning device and method which alleviates or solves the foregoing problems.

In particular, it is an object of the invention to provide a tape cleaning kit in which simple, easy to use devices are provided for cleaning the record/reproduce heads and the capstan wheels of data tape transports.

It is a further object of the invention to provide a cleaning element for such devices which is relatively easy to insert into and remove from such cleaning devices, and which stays firmly in place during use.

It is a further object of the present invention to provide a kit containing cleaning cassette devices which are relatively simple in construction and inexpensive to manufacture, as well as being easy to use.

SUMMARY OF THE INVENTION

In accordance with the present invention, the foregoing objectives are met by the provision of a tape transport cleaning kit in which separate cleaning cassettes are provided, one for cleaning the record/reproducing head, and the other for cleaning the capstan wheel of the tape transport. This has the distinct advantage of reducing the confusion of the user because each cassette has a clearly-defined, single function and cannot be used or misused for the wrong function. Furthermore, no assembly of components is required when using the device; each cassette merely needs to be inserted into the tape transport and removed.

In accordance with a further feature of the invention, the two cleaning cassettes are made to be compatible so that they both use the same cleaning element. Thus, the kit need contain a supply of extra cleaning elements of only one type. Not only does this reduce costs, but it also reduces the confusion of the user since only one cleaning element is provided.

In an additional feature of the invention, both cleaning cassettes in the kit have the same cleaning cassette identification element. This element is movable between at least two positions to indicate to a variety of different tape transport devices that it is a cleaning cassette. It can be used both with conventional tape transports which do not have software or firmware necessary to adopt the newly-adopted cleaning cassette recognition standards, as well as those which do. The identification advantageously is a clip which can be clipped onto both the head-cleaning cassette and the capstan wheel-cleaning cassette, thus further saving cost.

In another advantageous feature of the invention, the cleaning element is made of absorbent foam material which has a permanent linear indentation in which the foam material is fused so as to form at least one groove across the cleaning element which is tough and flexible. The cleaning element is mounted in the cleaning cassette by inserting the element sideways into a slot which has at least one linear projection or ridge which is inserted into the groove.

The groove and ridge preferably extend in a direction transverse to the direction in which the forces applied to the cleaning element during wiping action would tend to pull the cleaning element out of the holder. Thus, this construction securely holds the cleaning element in place during use, while making it easy to slide into and out of the cleaning element holders when it is replaced.

In accordance with another feature of the invention, the cleaning elements extend farther out of the holders than some prior cleaning elements, and are made substantially more dense so that they have a greater resilience. This enables the elements to brush hard against all surfaces of the recording/reproducing head and give good cleaning action without the use of spring mountings for the wiper arm such as have been used in the past.

Another advantageous feature of the invention is that, instead of providing a thick flange at the top of the cassette a simple projection is provided instead of the thick flange, and it is located directly above the gap in the bottom flange used as part of the detent mechanism holding the cassette in place when it is inserted into the tape transport mechanism. This saves material and allows simplification of the molding process used to make the capstan wheel cleaning cassette, and thus reduces manufacturing time and cost.

The drive mechanism used to drive the wiper arm in the head wiping cassette utilizes a pair of spur gears driven at a greatly reduced speed by a drive wheel contacting the capstan drive wheel. One of the spur gears uses a circular cam which rides in a generally oval cam follower on the wiper arm. This causes the arm to reciprocate around a pivot point.

In the mini-cassette version of the invention, the pivot point is located relatively close to the wiper element so that the wiper arm moves through a relatively wide arc. This insures that the wiper element will wipe across the whole surface of the magnetic record/reproduce head.

In the larger "standard" cassette version of the invention, which has a relatively large space in which the wiper arm can move, the cam follower is located between the pivot point for the wiper and the wiper element. This gives a longer radius for the arc of movement of the wiper element, thus giving a flatter travel path and better cleaning action for the wider record/reproduce head of the tape transport.

The foregoing and other objects and advantages of the invention will be set forth in or apparent from the following description and drawings.

DESCRIPTION OF THE PREFERRED EMBODIMENTS

CLEANING KIT

Figure 1:
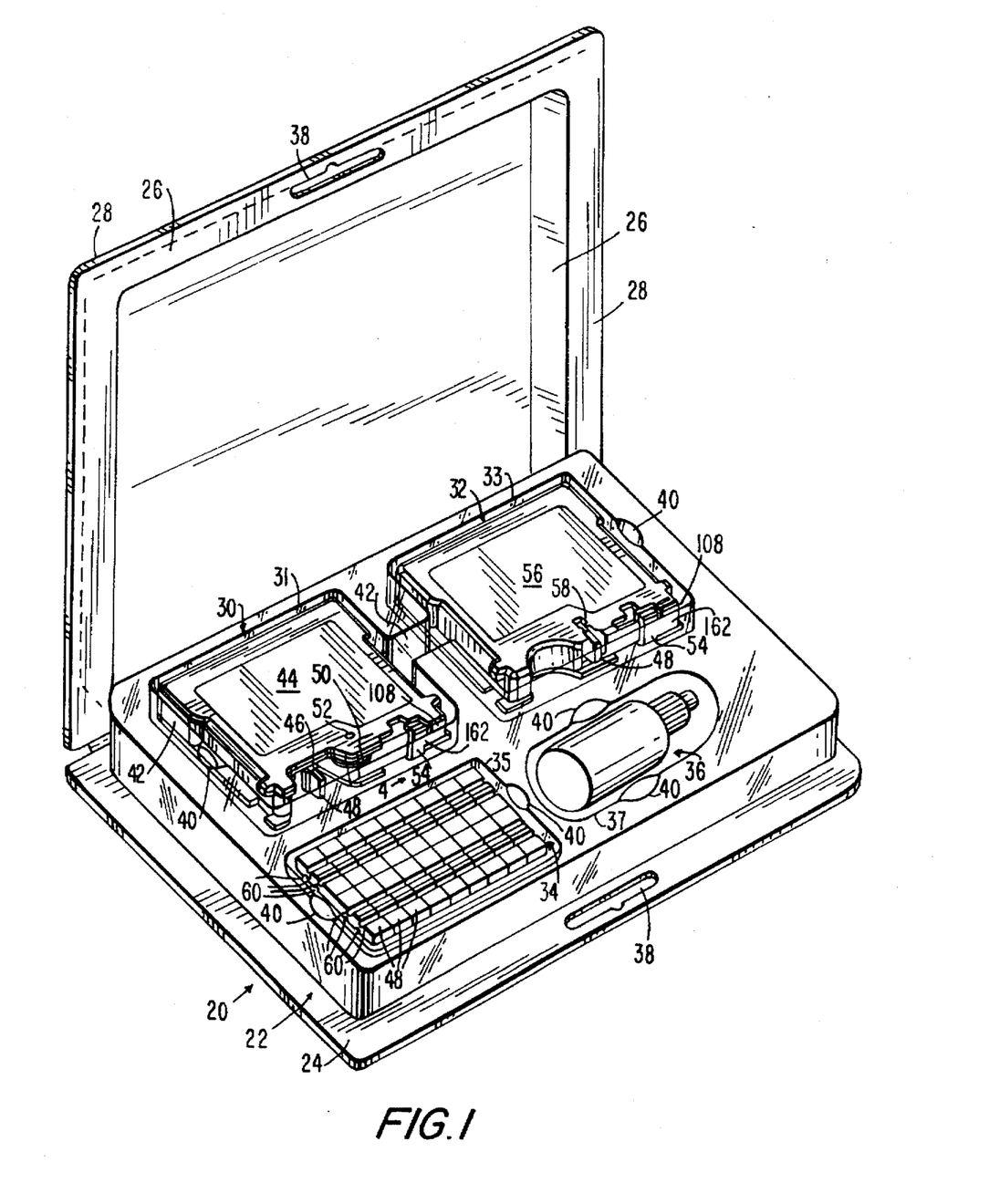
FIG. 1 is a perspective view, partially broken away, of a cleaning kit constructed in accordance with the present invention.

FIG. 1 is a perspective view, partially broken away, of a kit for use in cleaning a mini-cartridge data tape transport mechanism.

The drawing of FIG. 1 also represents a cleaning kit for cleaning larger "standard size" data tape transports, since the cleaning cassettes and accessories used in such a kit are substantially the same as the cassettes and equipment shown in FIG. 1, except they are larger.

The "mini" cassettes are also identified as "3.5 Inch Form Factor" cassettes, and the "standard" cassettes are referred to as "5.25 Inch Form Factor" cassettes.

The kit 20 shown in FIG. 1 includes a transparent plastic container with a vertical side wall 22 and a lower flange 24. The container has a hinged cover with a vertical side wall 26, which also has an outwardly-extending flange 28. Each of the flanges has a slot 38 used to hang the kit on a display rack in a store. The vertical wall 22 forms a pedestal with cavities formed in the pedestal into which the various parts of the kit are inserted.

The kit includes a record/reproduce head cleaning cassette 30 mounted in a recess 31, and a separate capstan wheel cleaning cassette 32 mounted in another recess 33.

The kit also includes a supply or block 34 of cleaning elements 48 to be used as replacements for the cleaning elements 48 contained in the cassettes 30 and 32. The block 34 of cleaning pads rests in a recess 35. The cleaning elements are partially die cut so that a separate element can be easily torn off from the block of elements by the user when one is needed.

The kit 20 also includes a dispensing bottle 36 of liquid solvent to be applied to the cleaning pads before use. The solvent bottle 36 rests in a recess 37.

Separate finger recesses 40 and 42 are provided at the edges of each of the recesses to give the user easy access to remove the parts from the recesses.

In contrast to most prior kits, there is only one type of cleaning element 48 supplied, and there are no special tools for removing cleaning elements and replacing them because such tools are not needed.

Figure 2:
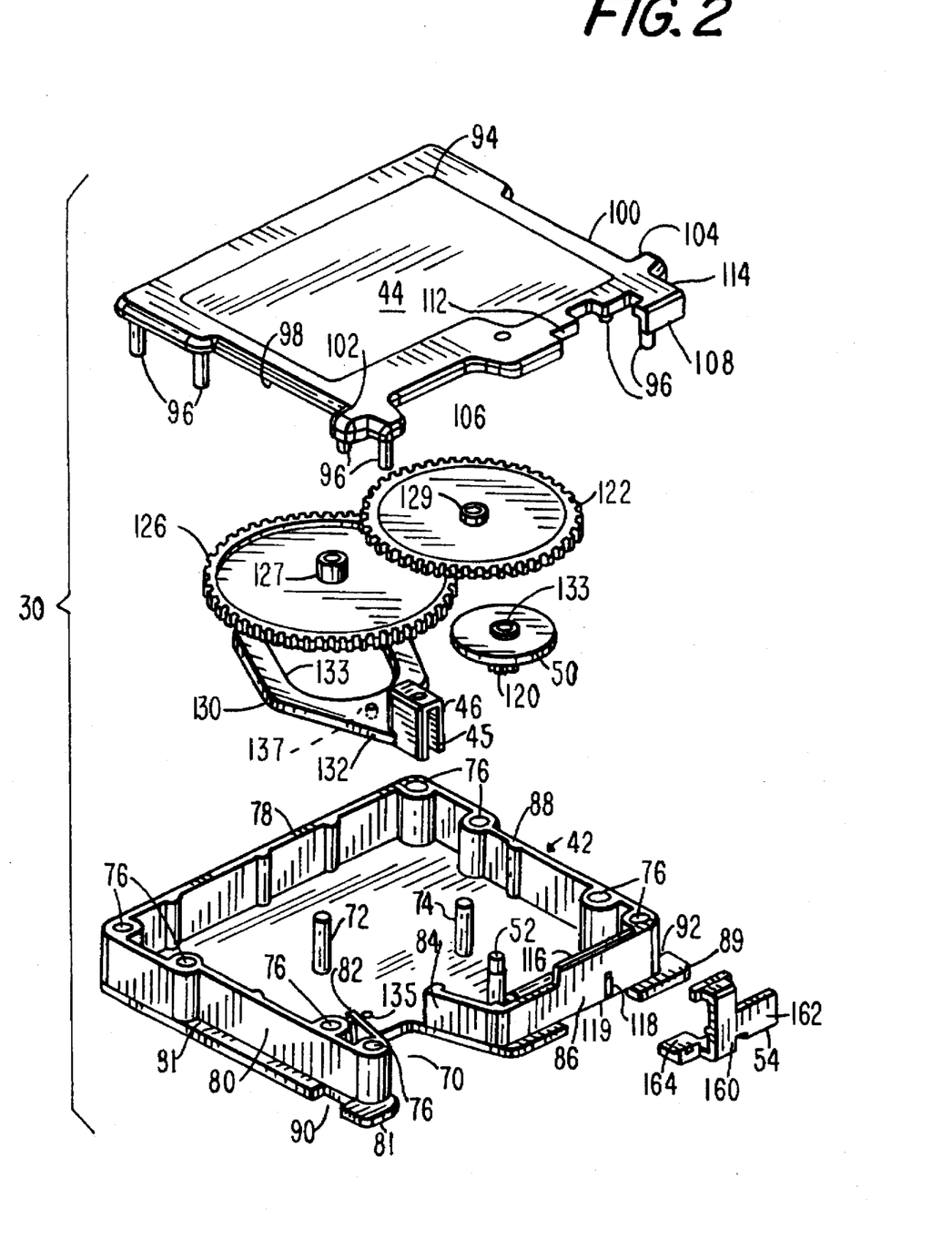
FIG. 2 is a perspective exploded view of one of the cleaning cassettes of the kit shown in FIG. 1.
Figure 6:
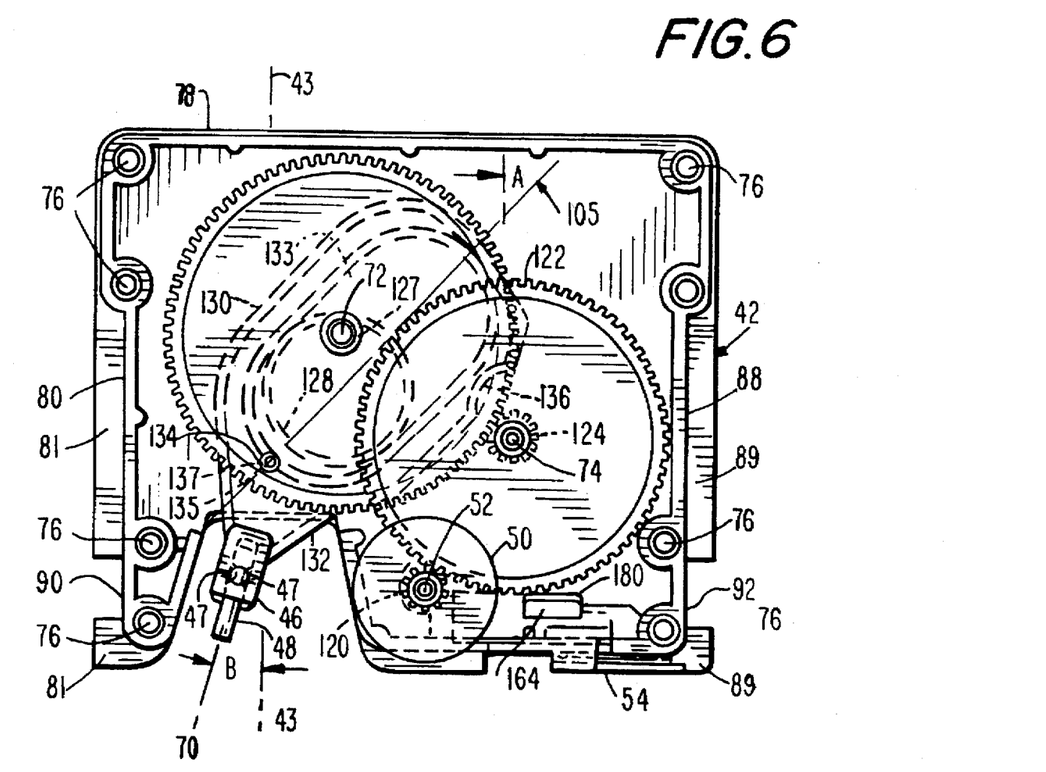
FIG. 6 is a top plan view of the cleaning cassette shown in FIG. 2, with the cover removed.
Figure 7:
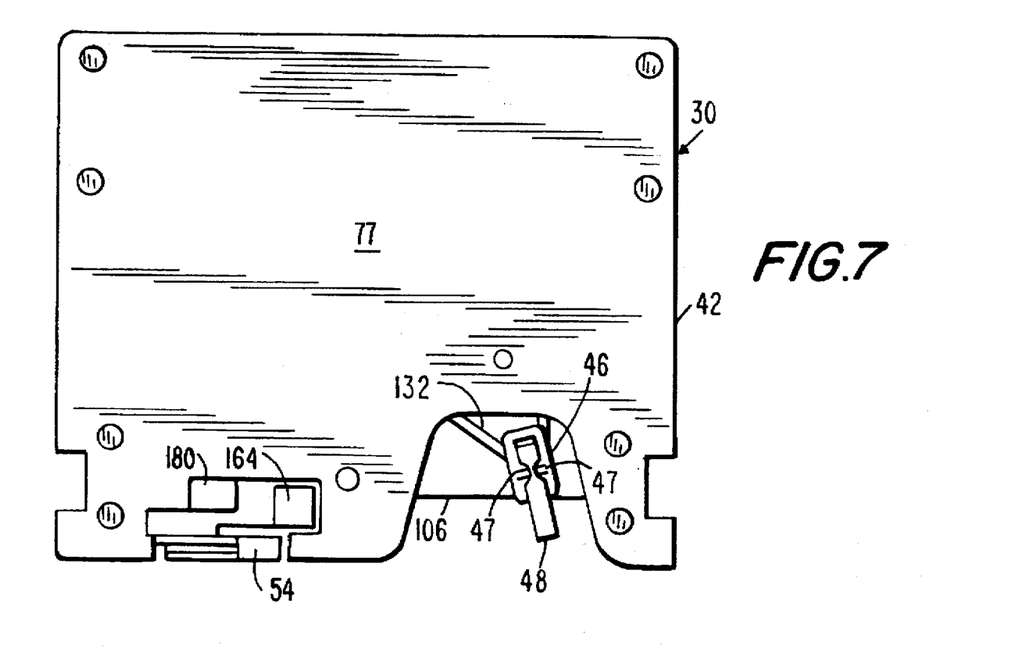
FIG. 7 is a bottom plan view of the cassette shown in FIG. 6.

As is shown more clearly in FIGS. 2, 6 and 7, the head cleaning cassette 30 includes a body member 42 and a cover 44. A cleaning element holder 46 is provided in the end of a pivotable arm 132 and contains a cleaning element 48.

Figures 3, 5:
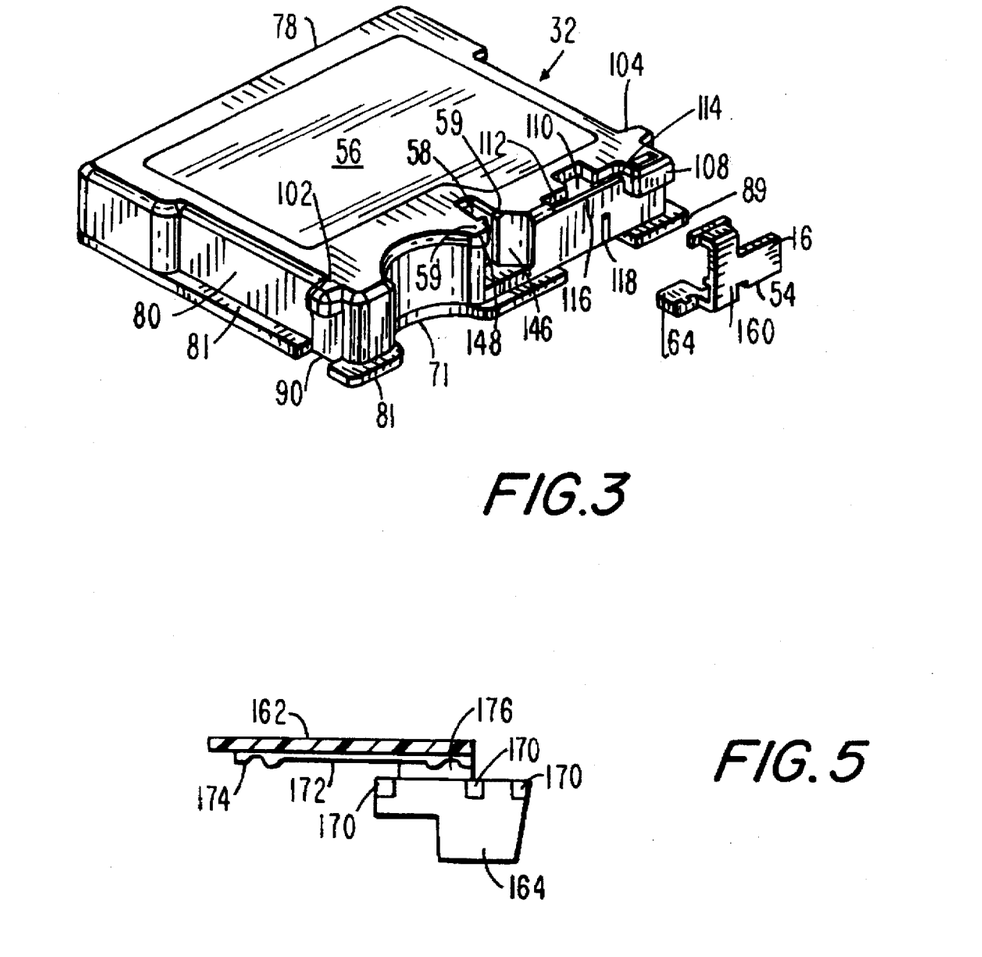
FIG. 3 is a perspective exploded view of the other cleaning cassette of the kit shown in FIG. 1.
FIG. 5 is a cross-sectional view taken along line 5—5 of FIG. 4.

As it is shown in FIGS. 1 and 3, the capstan wheel cleaning cassette 32 has only a single body member 56 and has no cover because none is necessary. This simplifies and reduces the cost of manufacturing the cassette.

The capstan wheel cleaning cassette 32 includes a cleaning element holder 58 holding a cleaning element 48 identical to the element 48 used in the cassette 30.

Each of the cassettes 30 and 32 has a cleaning cassette indicator element 54 which is slidable to convert it to identify the cleaning cassette as a cleaning cassette to various different types of tape transports, as it will be described in greater detail below.

Figure 8:
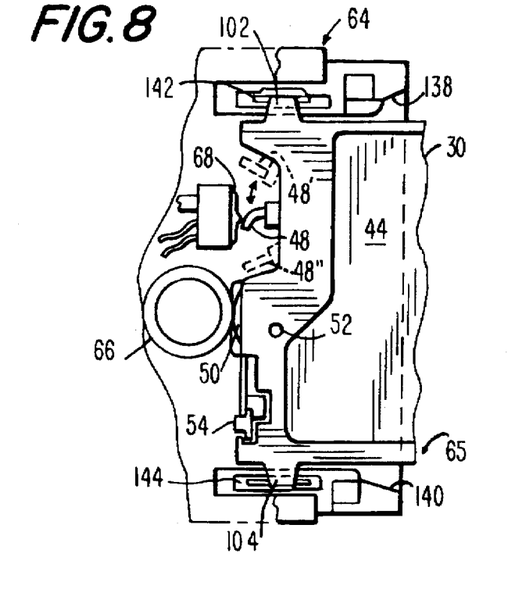
FIG. 8 is a top plan view, partially broken away and partially schematic, showing the operation of the head cleaning cassette of FIG. 2 in a data tape transport mechanism.
Figure 9:
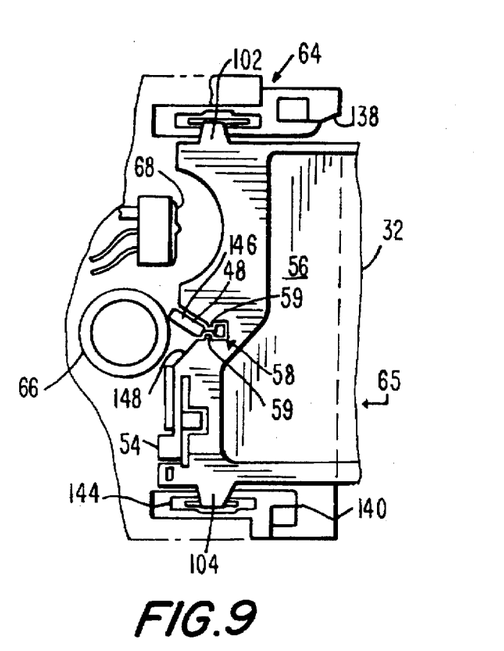
FIG. 9 is a view like that of FIG. 8 showing the capstan wheel cleaning cassette of FIG. 3 in place in a tape transport and being used for cleaning the capstan wheel.

FIGS. 8 and 9 show how the two cleaning cassettes 30 and 32 are used in cleaning the record/reproduce head and capstan wheel elements of a tape transport mechanism 64.

Referring to FIG. 8, the head-cleaning mini-cassette 30 is used as follows. First, a few drops of solvent are squeezed from the bottle 36 onto the cleaning element 48. Then the cassette 30 is inserted into the inlet opening of the tape transport in the direction indicated by the arrow 65. Detent wheels 142 and 144 at the sides of the transport mechanism engage with slots in the bottom flange of the cassette to lock it into operative position, as it will be described in greater detail below.

The tape transport 64 has a recording/reproducing head 68 whose cross-section looks somewhat like a shallow letter V. It extends outwardly in the center to form a vertical ridge, and has sloping sides.

The tape transport then is turned on for a time to clean the record/reproduce head 68.

The spring-mounted capstan drive wheel 66, usually made of rubber, is used to drive the tape in the usual data tape cassette. Its surface makes contact with a drive wheel 50 rotatably mounted slightly inwardly from 42 the forward edge of the cassette 30. The drive wheel 50 is pivoted on a shaft 52.

The cleaning element 48 is shown in three different positions. It is shown in solid lines contacting the head 68 and bending by a substantial amount as it is passing over the central portion of the head 68, thus wiping forcefully on the sloping surface leading up to the ridge and cleaning it thoroughly.

The element 48 then swings upwardly to a second position 48', shown in dashed lines, so as to clear the head completely, and then returns downwardly to a third position shown in dashed lines at 48" after having brushed across the head in the opposite direction and making thorough and intimate cleaning contact with the head.

When the head 68 has been cleaned, the cassette 30 is removed. As it is shown in FIG. 9, the capstan drive wheel cleaning cassette 32 then is inserted into the tape transport and the cleaning element 48 is pressed firmly against the capstan wheel after having been treated with solvent. The tape transport then is run for a time so as to clean the surface of the capstan drive wheel 66.

When one of the cleaning elements 48 becomes too dirty or worn, a new element is broken loose from the block 34 (FIG. 1) and inserted into one of the cassettes.

HEAD CLEANING CASSETTE

The details of the head cleaning cassette 30 are shown in FIGS. 2, 6 and 7, as well as in FIG. 1.

Referring particularly to FIGS. 2 and 6, the body member 42 is a single molded part having a relatively deep indentation 70 in the front edge, recessed side walls 80 and 88, a rear wall 78, and molded pins 72, 74 and 52. Two angular side walls 82 and 84 are located at the sides of the indentation 70.

Also provided are several mounting holes 76 at the four corners of the cassette.

The cover 44 shown at the top of FIG. 2 has a plurality of studs 96 projecting downwardly and sized to fit into the holes 76 with an interference fit so that the cover can be simply press-fitted into place on the body member 42 to close the cassette.

A pair of lower flanges 81 and 89 is provided on the body member 42. Each of the lower flanges has a notch or a gap 90 or 92 which is provided in accordance with industry standards to engage with spring-mounted detent wheels 142, 144 (FIGS. 8 and 9) in the tape transport to properly locate the cassette in the tape transport.

It is standard construction for cleaning cassettes, as well as data cassettes, to have an upper flange which is greater in thickness than the lower flange 81 or 89 and greater in thickness than the inlet gap into which the flange is inserted in order to prevent the user from inserting the cassette upside down. The thicker upper flange will not enter the slot but the thinner lower flange 81 or 89 will.

In accordance with one feature of the invention, referring to the upper part of FIG. 2, instead of an upper flange, the sides of the cover 44 are recessed at 98 and 100 and two projections 102 and 104 of the proper thickness are provided instead of complete flanges. The recesses 98 and 100 save plastic material.

The front edge of the cover is indented at 106 but not nearly as deeply as the body member 42 is indented at 70.

An opening 110 is cut in the front edge of the cover, and a recess 112 is provided, for purposes to be described later. A front edge projection 108 also is provided, for purposes to be described later.

WIPER ARM OPERATING MECHANISM

The operating mechanism for operating the wiper arm of the head cleaning cassette 30 is best seen in FIGS. 2 and 6.

The drive wheel 50 which is driven by the capstan wheel, is rotatably mounted on a shaft 52 which passes through a hub 133. On the underside of the wheel 50 is a small-diameter spur gear 120. Despite the appearance given by the exploded view in FIG. 2, as it is shown in FIG. 6, the wheel 50 overlies a large-diameter spur gear 122 which is rotatably mounted on pin 74 via a central hub 129, and meshes with the spur gear 120. As it is shown in FIG. 6, the gear 122 has a small spur gear 124 attached to the hub 129 on the underneath surface, and the gear 124 meshes with a large spur gear 126 which is rotatably mounted on the pin 72 through a hub 127.

Still referring to FIG. 6, on the underside of the spur gear 126 is an eccentric circular ring 128 extending downwardly from the lower surface of the gear 126. The eccentric ring 128 serves as a cam and rides in a cam follower 133 in a member 130 whose forward end forms the arm 132 which supports the cleaning element holder 46. As it is shown in FIG. 2, a vertical pin 137 extends downwardly from the lower surface of the member 130. This pin 132 is rotatably inserted into a hole 135 in the lower surface of the body member 42 and serves as the pivot point about which the wiper arm pivots when wiping the cleaning element 48 across the face of the recording/reproducing head.

As it is evident from FIG. 6, the shape of the oval cam follower 133 is that of two semicircles, each having a diameter slightly larger than the outside diameter of the ring 128, joined by two straight sections, thus giving the cam follower 133 an oval shape. A curved cut-out 136 is provided in one edge of the member for clearance purposes.

As it is shown in FIG. 6, the longitudinal axis 105 of the oval cam follower surface 133 forms an acute angle A with a line 107 perpendicular to the front face of the cassette. The angle between the centerline of the cleaning element and the line 43 is "B". Angles A and B will vary, during reciprocating motion of the cleaning element arm, over a total of approximately 46°; the angle B varies 23° on either side of the centerline 43.

As the wheel 50 rotates at a relatively high speed, the speed of rotation is greatly reduced by the gears 122 and 126 and a fairly rapid reciprocating motion results. As the gear 126 rotates, the cam drives the cam follower first clockwise and then counterclockwise around the pivot point 134 shown in FIG. 6 comprising the pin 137 inserted into the hole 135.

This arrangement has a distinct advantage in that the pivot point 134 is located between the pivot point for the gear 126 and the cleaning element 48. This gives a relatively large angle of movement of the cleaning element, thus maximizing the travel of the head despite a relatively narrow opening at 70 in which the arm can move.

WHEEL CLEANING CASSETTE

Figure 14:
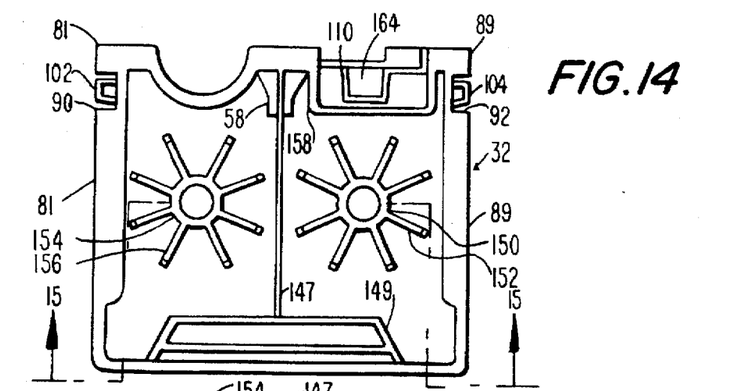
FIG. 14 is a bottom plan view of the capstan wheel cleaning cassette of FIG. 3.
Figure 15:
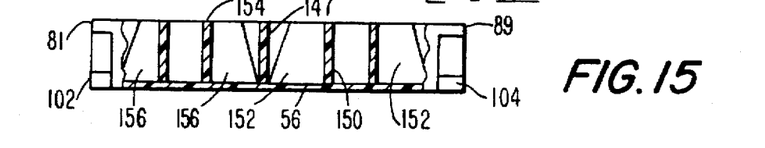
FIG. 15 is a cross-sectional view taken along line 15—15 of FIG. 14.

The capstan wheel cleaning cassette is shown in FIGS. 1 and 3, as well as in. FIGS. 14 and 15.

As noted above, the body member 56, the cassette indicator clip 54, and the cleaning element 48 make up the cassette 32.

The body 56 has an arcuate indentation 71, and the fixed cleaning element holder 58 with angled side walls 146 and 148.

As in the cassette 30, the projections 102 and 104 are aligned, respectively, with the gaps 90 and 92 in the lower flanges 81 and 89 of the cassette. This allows the projections 90, 92 to be molded without side action in the mold. That is, the projections 102 and 104 can be molded simply by inserting a mold part through the slot 90 or 92. This avoids having to move a separate mold part sideways to form an upper flange, as would be required if the projections 102, 104 were not used instead of full upper flanges. Thus, this construction saves considerable cost in the mold and in the molding process for making the cassette 32.

FIG. 14 is a bottom plan view of the cassette 32, and FIG. 5 is a cross-sectional view taken along line 15—15 of FIG. 14.

As shown in FIGS. 14 and 15, the cassette 32 has vertical walls 147, 149, 158, and hub and spoke structures 150, 152, 154 and 156 with upper edges in or slightly below the same plane (see FIG. 15) as the lower edges of the cassette housing so as to give the user the same type of tactile "feel" when grasping the cassette as if the cassette had a bottom wall. This is done to avoid the need for the considerably greater cost of providing a separate cover for the cassette. The structures 147, 149, 150, etc., are relatively easy to mold with movement of mold and part in only one direction in the same operation as the rest of the cassette, thus providing a relatively simple, inexpensive manufacturing process.

INDICATOR ELEMENT

The indicator element 54 has the purpose of identifying the cleaning cassette as a cleaning cassette instead of a data tape cartridge in any tape transport in which it might be used.

Figure 4:
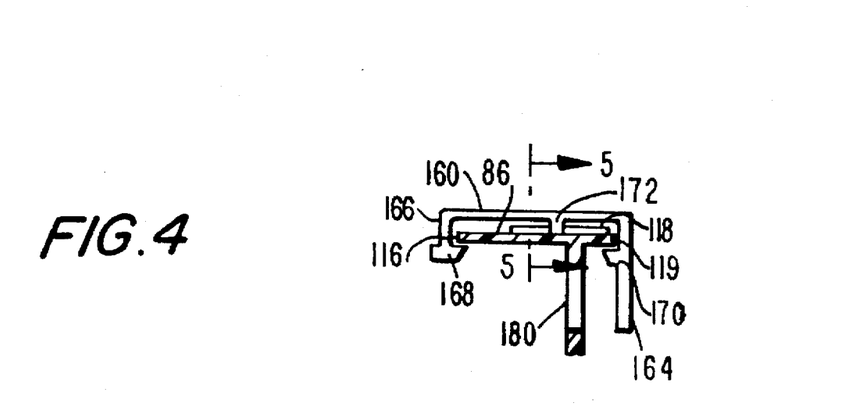
FIG. 4 is a cross-sectional view taken along line 4—4 of FIG. 1.

Referring to FIG. 1 as well as FIGS. 2, 4 and 5, the indicator 54 comprises a molded plastic clip structure 160 with a flat front surface 162 and a light-blocking shutter element 164.

FIG. 4 is a cross-sectional view taken along line 4—4 of FIG. 1. As it is shown in FIG. 4, the front wall 86 of the cassette has a pair of edges 116 and 119 which are embraced by arms 166 and 164 of the indicator device. The arm 166 has a flanged lower edge 168 and a plurality of projections 170 (see FIG. 5), each of which has a sloping lower inner face. Thus, the device 54 can be snapped into place by simply pressing the device 54 against the surface 86. This causes a camming action by engagement of the edges 116 and 119 against the sloped lower edges of the projections 168 and 170, and causes the indicator device to snap into engagement with those edges.

As it is shown in FIGS. 4 and 5, the indicator 54 has a detent mechanism including an elongated rib 172 projecting from the underside of the member 162, with two grooves 174 and 176 at opposite ends. These grooves mate with a transverse projection 118 on the front face 86 (also see FIG. 2) so that the slide element will be locked in one of two positions where the ridge 118 fits into one of the two recesses 174 or 176.

The two possible positions to which the indicator 54 can be moved is all the way to the left or all the way to the right, as is shown in FIGS. 1 and 2.

As it can be seen in FIG. 2, the cover 44 has an indentation in the leading edge at 110.

As it is also shown in FIG. 7, the bottom wall 77 of the cassette 30 has a hole 180, inwardly from the front edge of the cassette. This hole lines up with the gap 110 in the cover to form a vertical passageway through the cassette. At this location, the cleaning cassette will allow a light beam to travel through the cassette, if it is not blocked by the shutter member 164. This indicates, in some tape transport devices, that a cassette is not in place in the machine. When the shutter member 164 covers this passageway, that indicates to such tape transports that a cassette is in place.

As it is well known in the art, essentially all data tape transports have feeler switches (not shown in the drawings) which will detect the presence of a cassette in the machine, and whether the cassette is enabled to record.

In accordance with newly adopted industry standards created by Quarter Inch Cartridge Drive Standards Inc., of Santa Barbara, Calif., in the future standard tape transports will contain software or firmware which will enable the tape transport to detect automatically whether the cassette is a cleaning cassette or a data tape cartridge. This is done by providing an indicator on the cassette which will indicate to the tape transport that there is no tape cassette in place, but that the tape transport is enabled to record on a cassette. This unnatural combination of signals then will be taken as a unique condition in which the machine knows that only a cleaning cassette is in place.

Thereafter, this information can be used to record when the cleaning process was done so as to display this information at a later time in order to keep good maintenance records, or to cause the tape transport to run for a preset time to insure a proper amount of cleaning time; or to modulate the speed of running of the tape transport to optimize cleaning; or to provide a reminder for when the next cleaning is due. Also the transport could shut down when the data error rate it detects is too high, and then re-enable the drive when cleaning has been done. Of course, any combination of the above functions could be performed, as desired, using the detection of the insertion of a cleaning cassette as a starting signal.

The foregoing standards are met in the mini-cleaning cassettes 30 and 32 by the indicator device 54, which operates as follows.

With standard tape transports sold today that have no special software or firmware to enable them to recognize cleaning cassettes, the slide 54 is moved to its farthest right position, in which the surface 162 closes the cassette detection microswitch (not shown) in the tape transport. The surface 108 contacts the write-enable microswitch (not shown) to indicate that the tape in the cassette can be recorded upon. This enables the tape drive system to operate as if a tape cassette were being recorded upon, and cleaning proceeds in the manner described above.

With the slide 54 in this position, as it is shown in FIG. 6, the shutter member 164 covers most of the hole 180 in the bottom panel 77 (FIG. 7), which is aligned with the hole 110

(FIGS. 2 and 3), to prevent light from passing through the cassette. This condition, in which the light passage is blocked, indicates, to tape transports which use light detection, that a cassette is in place. This also results in the enablement of the presently available standard tape drives of this type so as to enable the transport mechanism to operate during cleaning.

When used with tape transports having the new firmware referred to above, the slide 54 is moved all the way to the left, as shown in FIG. 2, and as shown in FIG. 7.

In this position, the panel 162 no longer fills the space below the projection 108. Thus, there is no cassette surface at the right location to close the cassette detecting microswitch, and the tape transport senses a "no cassette present" condition. The projection 108 still creates a write-enable signal. Thus, the two conditions for the new standards are met to provide automatic cleaning cassette detection.

In the left-hand position, the shutter member does not cover the light passageway through the cassette, thus also creating a "no cassette present" signal to the light-detecting type of transport.

Thus the indicator structure gives the proper indications to all known types of data tape transports, including those not having the new firmware, to ensure that the cleaning cassettes 30 and 32 can be used in them.

CLEANING ELEMENT

Figure 10:
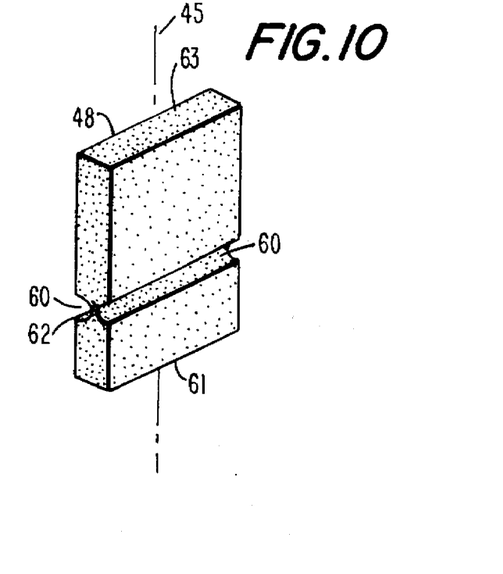
FIG. 10 is a perspective view of a preferred cleaning element constructed in accordance with the present invention.

The cleaning element 48 is shown in an enlarged perspective view in FIG. 10. It is made of a block of fully-reticulated and compressed polyurethane foam. The element has a linear fused area 62 which extends transversely to the longitudinal axis 45 of the element 48. The fused area 62 is formed by embossing two grooves 60 as shown in FIGS. 12 and 12A.

Figures 12, 12A:
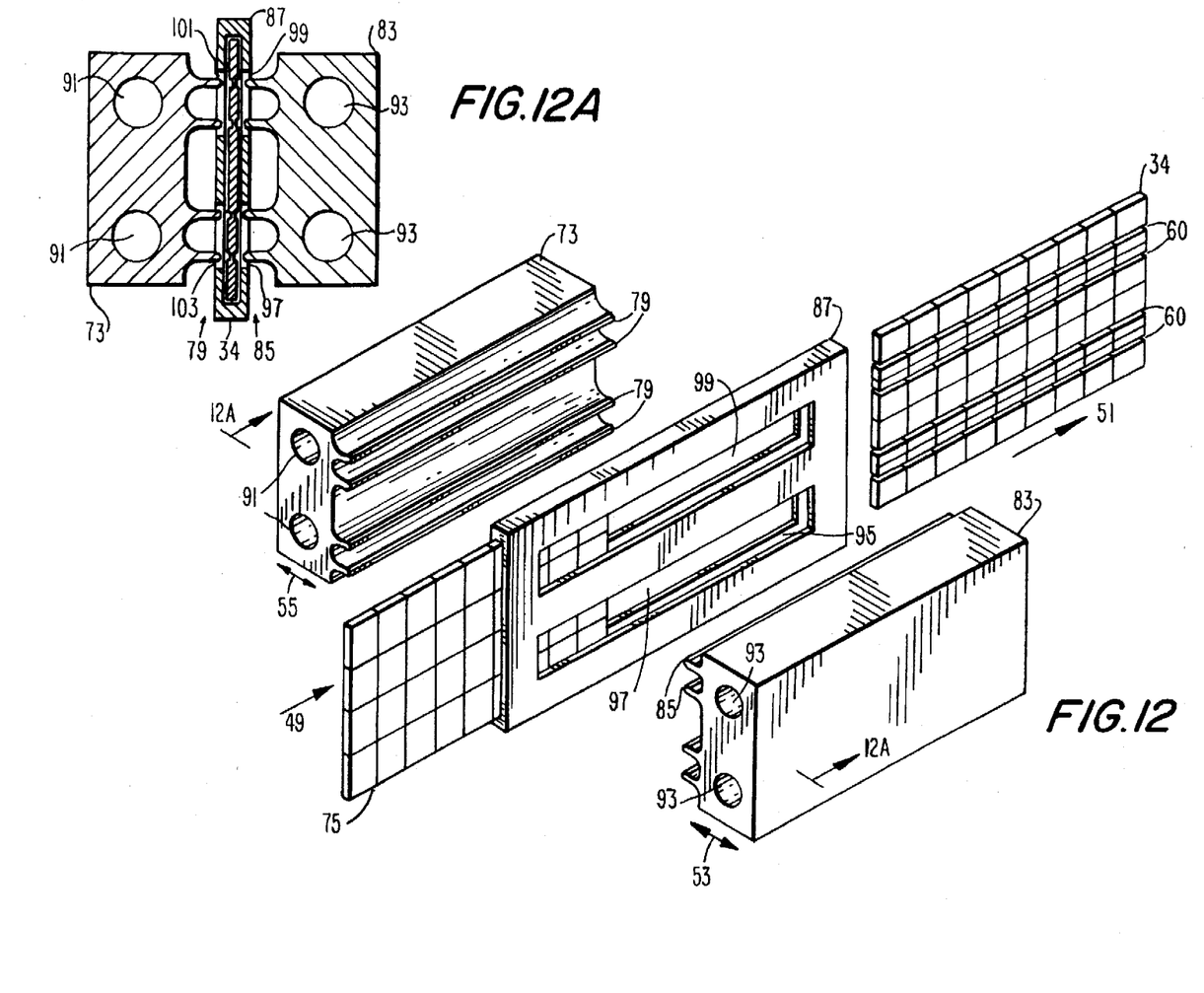
FIG. 12 is a schematic view of equipment used in the method of making the cleaning element of the invention.
FIG. 12A is a cross-sections view taken along line 12A—12A of FIG. 12.

FIG. 12 is a schematic perspective view of equipment used to emboss the grooves 60.

Referring to FIG. 12, a block 75 of polyurethane foam, die-cut to partially cut out four rows of individual elements 48, is inserted into a stationary guide 87 in the direction 49. The guide 87 has a hollow interior 95 within which the foam block 75 slides. The guide 87 has four windows 97, 99, 101 and 103 (see FIG. 12A) through which embossing dies are inserted.

The embossing device includes a first die 73 with four blades 79, and a second die 83 with four blades 85. Each die is heated by means of heating elements located in holes 91, 93. This heats the blades 79, 85 to a temperature of from approximately 400° F. to 500° F. The dies 73, 83 are moved, as indicated by the arrows 53, 55, in alignment with one another, as shown in FIG. 12A, to compress the foam material and fuse it to form the grooves 60. This gives the grooves 6 hardened surfaces which strongly resist deformation and give good holding power when the grooves 60 mate with two opposed projections 47 (FIGS. 6 and 7) in the slot 45 (FIG. 2) in the holder 46 into which the element 48 is inserted. Similar projections 59 (FIG. 3) are provided in the slot of the holder 58 (also see FIG. 9) in the capstan wheel cleaning cassette 32.

The guide 87 provides means for accurately locating the foam block 75 vertically. The dies 73, 83 also are located vertically so as to accurately locate the grooves 60 from the ends 61 and 63 of the cleaning elements.

Referring again to FIGS. 8 and 9, it can be seen that the cleaning element 48 is bent severely as it makes cleaning contact with either the head 68 or the wheel 66.

The element 48 shown in FIG. 8 flexes first one way and then the other on each successive sweep over the head surface. The element 48 shown in FIG. 9 bends severely in one direction until it rests against one of the angled walls 146 and 148 at the entrance of the cleaning element holder 58, and then in the other direction, depending on which way the wheel 66 turns.

Most of the frictional forces applied to the elements 48 during cleaning are in a direction tending to pull the elements out of their holders, that is, in the direction of the longitudinal axis 45. However, because of the extremely secure grip given by the transverse projections 47, 59 fitted into the transverse grooves 60 with their hardened, fused surfaces, the elements stay in the holders, despite the forces tending to pull them out.

This holding power is used to considerable advantage. The foam material used to make the cleaning elements is made considerably denser and more resilient than normal by compressing the foam by a ratio of at least 12 to 1, as compared with the ratio of 6 to 1 used in prior cleaning elements of a similar type.

This enables the portion of each element extending out of the holder to be considerably longer than in prior devices, without losing much scrubbing force. This is because the foam is much stiffer than in prior elements and exerts considerable force on the surfaces it cleans, despite its extra length.

One substantial advantage of this is that enough of the cleaning element extends out of the holder so that it can be grasped with the fingers to remove or install it. Therefore, unlike some prior cleaning elements, the element 48 can be changed without the use of special tweezers or other tools.

Another advantage of this structure is that the head cleaning element 48 shown in FIG. 8 will make intimate contact with all surfaces of the head 68, even though the wiper arm which carries the element is not spring-mounted, as it is in some prior art cleaning cassettes. This reduces the number of parts needed, the complexity, and the cost of making the cassette, without loss of cleaning capability.

In fact, because the wiper arm pivots about a pivot point 134 (FIG. 6) which is located on the center line 43 of the opening 70 in which the wiper arm moves, uniform wiping is produced on both sides of the head 68 (FIG. 8). This is in distinct contrast to some prior art head cleaning cassettes.

A further advantage provided by the grooves 60 in the element 48 is that they provide smooth guideways for inserting the cleaning elements into the holders. The elements are inserted sideways (from above the page towards the page in FIG. 7), and the grooves 60 show the user how to inert and remove the cleaning elements.

Figure 11:
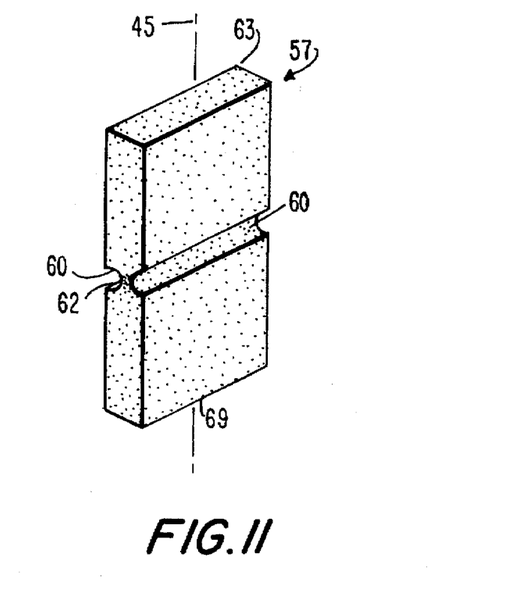
FIG. 11 is a perspective view of an alternative embodiment of the cleaning element of the present invention.

FIG. 11 shows an alternative embodiment 57 of the cleaning element. It is the same as element 48 except that, in the element 48, the grooves 60 are closer to the bottom and 61 than to the top end 63, whereas, in the element 57, the distance between the grooves 60 and the top 67. This makes the element 57 reversible. The slots in the holders are made deeper to accommodate the extra length. When a cleaning element 57 gets dirty, the user can remove the element, reverse it so the unused end extends out of the holder, and use it to clean the tape transport head until it, too, becomes dirty. Then the element 57 can be replaced with a new one.

The reason the non-reversible element 48 shown in FIG. 9 is preferred, for the moment, is that the element 48 is less confusing to use, and that is preferred over longer element life, at the present time.

The provision of the fused area 62 at the junction between the upper and lower positions of the cleaning element has a further advantage in that cleaning fluid, perhaps dirty, does not flow into the lower half of the element. This minimizes wasting of solvent, and avoids dirtying the lower half of the reversible element 57 and keeps it clean for subsequent use.

"STANDARD" CLEANING CASSETTES

Figure 13:
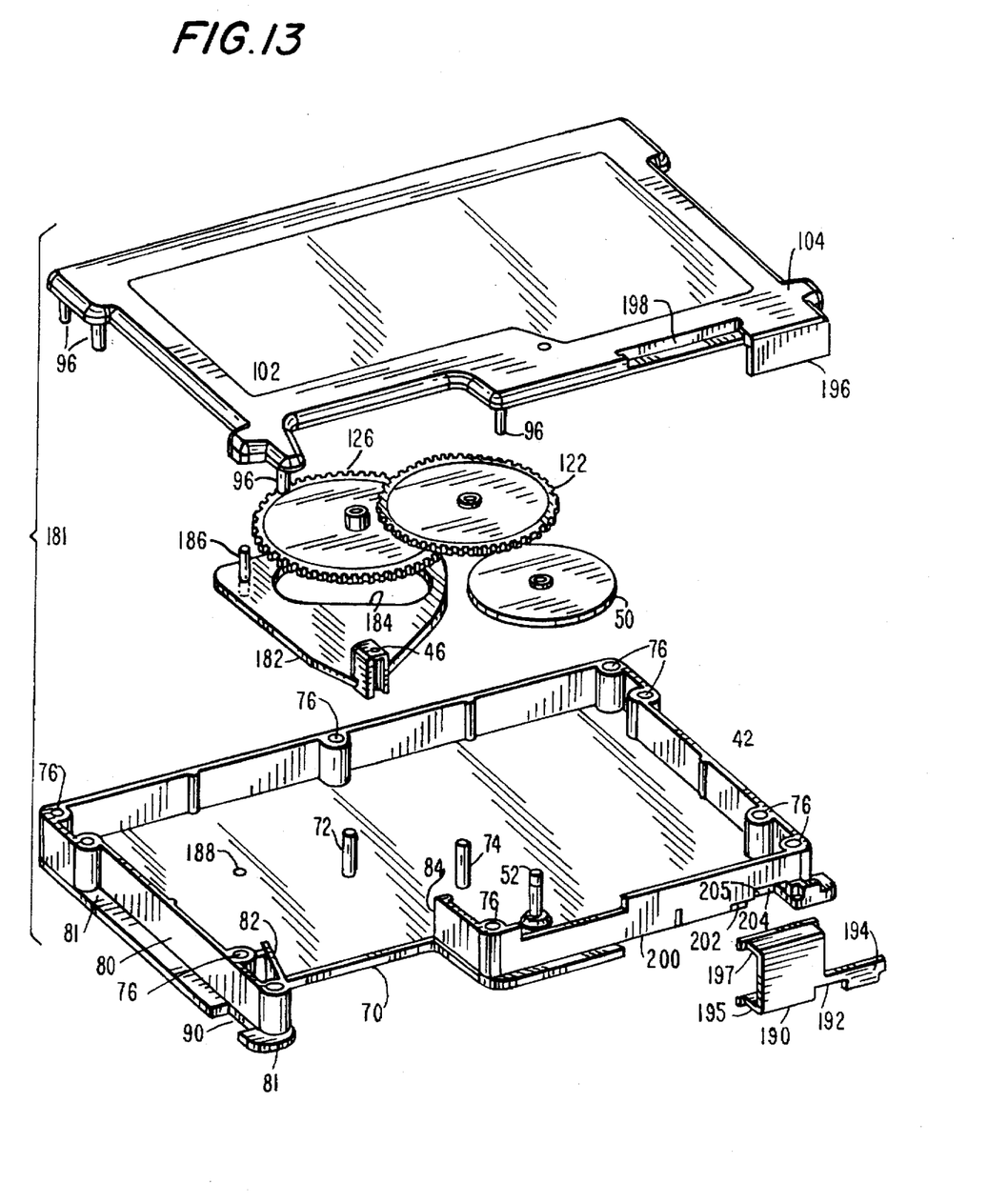
FIG. 13 is an exploded perspective view of a larger "standard" size cleaning cassette used in a "standard" cleaning cassette kit constructed in accordance with the invention.
Figures 16, 17:
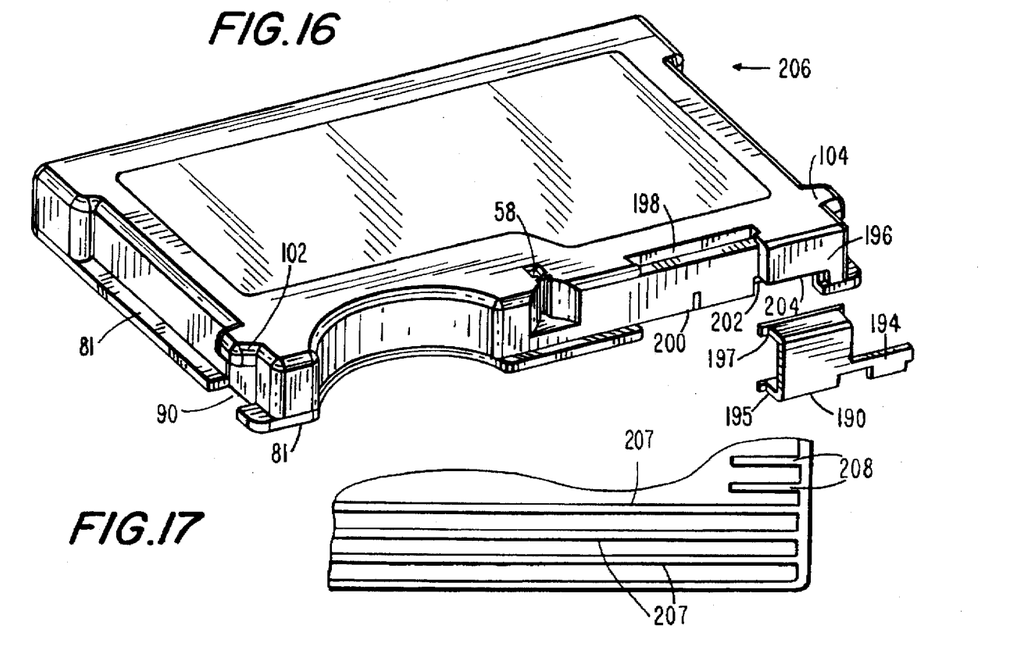
FIG. 16 is a perspective exploded view of the "standard" size capstan wheel cleaning cassette used in the same kit as the cassette shown in FIG. 13.
FIG. 17 is a partially broken-away bottom plan view of the cassette shown in FIG. 16.

FIGS. 13, 16 and 17 show the "standard" size (that is, 5.25" form factor) cleaning cassettes of the invention. They are larger but functionally the same as the mini-cassettes 30 and 32 described above, with certain exceptions. Therefore, the same reference numerals are used for corresponding parts in all cassettes.

A "standard" size head-cleaning cassette 181 is shown in FIG. 13, and a capstan wheel cleaning cassette 206 is shown in FIGS. 16 and 17.

The only significant difference in the drive system for the wiper arm of the cassette 181 in FIG. 13 is in the wiper arm cam follower and pivot point. The pivot point for the wiper arm 182 is defined by a shaft 186 which extends downwardly into a hole 188 in the bottom wall of the cassette.

This point is located behind the rotational axis defined by the pin 72 for the gear 126 so as to be as far as possible from the opening 70 in which the wiper arm moves. This takes advantage of the relatively great width of the opening 70, as compared with the same opening in the mini-cassette cleaner 30, and causes the cleaning element to traverse an arc of much greater diameter, thus keeping the cleaning element in intimate contact with the recording head over a greater length of arc.

In order to accommodate this new pivot point location, the cam follower 184 is aligned with its longitudinal axis rotated counterclockwise by about 90° with respect to the longitudinal axis of the cam follower axis of the mini-cassette cleaner. The angle through which the cleaning element 48 swings is about 34°, an angle considerably smaller than the corresponding angle for the mini-cassette 30.

A cleaning cassette identification slide 190 also takes the form of a clip. It has arms 195, 197 which snap over edges 198, 200 of the cover and base structure 42.

The surface 196 provides a record-enable indication to a micro-switch in the tape transport, like the surface 108 of the mini-cassette cleaner.

When the slide 190 is to the right, the only switch-accessible opening is created by the gaps 192 and 202.

When the slide 190 is to the left, switch-sensing openings are provided at 204 and 205, all as required by the above-described standards, to provide automatic identification when the slide is to the left, and standard operation to the right.

Except for the identification slide 190, the capstan wheel cleaning cassette 206 shown in FIGS. 16 and 17 is functionally the same as the mini-cassette 32.

There is a structural difference between the cassettes 32 and 206. As it is shown in FIG. 17, the tactile feel provided by elements 147, 149, 150, etc. in FIGS. 14 and 15 is provided by upstanding ribs 207 and 208 around the periphery of the hollow interior of the cassette casing. Since the cassette 206 is larger than the mini-cassette 32, there is no need for such ribs in the center of the cassette.

Thus, like the mini-cassette 32, the body of the cassette 206 is formed in a simple molding process, and has no cover. This helps to keep costs down.

The advantage of using a clip-on technique for fastening the slides 54 and 190 to the cassettes now becomes apparent.

The same clip can be attached to either the head-cleaning or the wheel-cleaning cassette by simply snapping it into place in the same manner. Thus, costs are minimized by enabling the use of the same indicator slide structure and the same assembly equipment for both cassettes of the same size.

Another advantage of using the same cleaning element in both the head and wheel cleaning cassettes is that a cleaning element which has been used to clean the record/reproduce head may be clean enough to use in the wheel cleaning cassette, and thus can be simply transferred from one cassette to the other rather than being discarded.

The above description of the invention is intended to be illustrative and not limiting. Various changes or modifications in the embodiments described may occur to those skilled in the art. These can be made without departing from the spirit or scope of the invention.

I claim:

1. A method of making a generally planar foam cleaning element for use in devices for cleaning tape-contacting members in tape transport mechanisms, each of said devices having a cleaning element holder with a receptacle for receiving said cleaning element, said receptacle having a pair of spaced apart side walls and at least one ridge extending into said receptacle to reduce the spacing between said walls along a line transverse to the edges of said side walls, said method comprising the steps of;

(a) providing a foam pad with two ends, said pad having a thickness to fit between said side walls; and (b) forming a fused indentation in said pad at a location intermediate said ends and dimensioning said indentation to reduce said thickness of said pad along a line at said location so that said ridge fits into said indentation.

2. A method as in claim 1 in which said forming step comprises embossing said foam pad, said pad being made of a thermo-plastic liquid-absorbing foam, said indentation being a linear groove extending transversely across said pad.

3. A method as in claim 1 in which said embossing step is performed using a pair of opposed heated embossing dies applied under pressure, a holder for holding a panel of said pads, and including the step of bringing said dies together to form linear indentations in opposite sides of said panel.

4. A method as in claim 3 in which said embossing element is heated to a temperature of 400° to 500° F.

5. A method as in claim 1 providing a sheet of said foam at least partially die-cut into individual pads in a row, and heat-embossing said pads by applying a linear heated element to all of said pads in said row simultaneously.

6. A method as in claim 5 in which said individual pads are die-cut with perforations so that they remain together during embossing but are easily separable by hand, and in which there are multiple rows of said pads, each being embossed with a separate pair of linear heated elements applied to each of said rows.

7. A method of making an elongated, generally flat rectangular foam cleaning pad for use in holders in devices for cleaning tape-contacting components of tape transports, said holders having a pair of spaced-apart walls with side edges, and at least one ridge projecting into the space between said walls in a direction transverse to said side edges, said method comprising the steps of:

(a) forming said pad of a material whose thickness allows said pad to fit into the spaces between said walls, and dimensioning said pads so that one portion extends outwardly from between said walls, (b) fusing said pad along a line intermediate the ends of said pad and transverse to the side edge of said pad to form a recess giving said pad a thickness along said line so as to fit between said side walls of one of said holders with said ridge fitted into said recess.

8. A method as in claim 7 in which each of said walls has a ridge extending into the space between said walls, said walls being parallel to and opposite the other of said ridges, thereby leaving a distance between said ridges substantially less than the distance between said walls elsewhere, said fusing step comprising fusing said pad along said line from both sides of said pad.

9. A method as in claim 7 in which said forming step comprises cutting said pad in a sheet of foam material.

10. A method as in claim 7 in which said ridge in said holder is substantially perpendicular to said side edges of said walls and said line is substantially perpendicular to said side edges of said pad.

11. A method as in claim 7 in which said pad forming step comprises at least partially cutting said pad, along with a plurality of other pads aligned in a row from a single sheet of material, said fusing step comprising contacting said row of pads substantially simultaneously with a heated ridge-form die dimensioned to span said pads.

* * * * *